United States Patent [19]

Gauger et al.

[11] 4,402,996
[45] Sep. 6, 1983

[54] ELECTRODE COATING WITH PLATINUM-GROUP METAL CATALYST AND SEMI-CONDUCTING POLYMER

[75] Inventors: Jurgen F. Gauger; Jean M. Hinden; Michael Katz, all of Geneva, Switzerland

[73] Assignee: Diamond Shamrock Corporation, Dallas, Tex.

[21] Appl. No.: 282,182

[22] PCT Filed: Oct. 14, 1980

[86] PCT No.: PCT/US80/01353
§ 371 Date: May 21, 1981
§ 102(e) Date: May 21, 1981

[87] PCT Pub. No.: WO81/00973
PCT Pub. Date: Apr. 16, 1981

[30] Foreign Application Priority Data

Oct. 10, 1979 [GB] United Kingdom ............... 7935463

[51] Int. Cl.³ ............................................ B05D 5/12
[52] U.S. Cl. ....................................... 427/86; 427/125; 427/126.3; 427/126.5; 427/226; 427/388.2; 524/403; 204/290 R; 429/42; 252/62.3 Q
[58] Field of Search ............... 427/58, 86, 87, 123, 427/125, 126.3, 126.5, 226, 374.2, 376.2, 376.4, 376.6, 377, 380, 383.7, 388.2, 115; 524/403; 204/290 R; 429/42; 252/62.3 Q

[56] References Cited

U.S. PATENT DOCUMENTS

| | | | |
|---|---|---|---|
| Re. 29,419 | 9/1977 | DeCraene | 204/290 F |
| 3,438,815 | 4/1969 | Giner | 429/42 |
| 3,438,817 | 4/1969 | Short et al. | 429/42 |
| 3,629,007 | 12/1970 | Kilduff | 136/27 |
| 3,674,675 | 7/1972 | Leaman | 204/290 R |
| 3,687,724 | 8/1972 | Keith et al. | 117/230 |
| 3,751,301 | 8/1973 | Kilduff | 136/26 |
| 3,761,679 | 9/1973 | Dall | 204/290 R X |
| 3,792,732 | 2/1974 | Stewart | 166/315 |
| 3,881,957 | 5/1975 | Hausler | 136/86 D |
| 4,043,933 | 8/1977 | Breault et al. | 429/42 X |
| 4,090,979 | 5/1978 | Ogren et al. | 252/441 |
| 4,118,294 | 10/1978 | Pellegri | 204/129 |

FOREIGN PATENT DOCUMENTS

| | | |
|---|---|---|
| 2220247 | 6/1973 | Fed. Rep. of Germany ... 204/290 F |
| 1024693 | 3/1962 | United Kingdom . |
| 1112285 | 5/1965 | United Kingdom . |
| 1147442 | 4/1969 | United Kingdom . |
| 1195871 | 6/1970 | United Kingdom . |
| 1231280 | 5/1971 | United Kingdom . |
| 1235570 | 6/1971 | United Kingdom . |
| 1418943 | 12/1975 | United Kingdom . |

OTHER PUBLICATIONS

Van Veen et al., Electrochimica Acta., vol. 24, pp. 921–928, 1979.

*Primary Examiner*—John D. Smith
*Assistant Examiner*—Richard Bueker
*Attorney, Agent, or Firm*—B. E. Harang

[57] ABSTRACT

A catalytic electrode has an electrically conductive substrate such as titanium with a coating comprising a platinum-group metal catalyst finely dispersed in a matrix consisting of a semi-conducting polymer formed in situ on the substrate. The catalyst may be a platinum-group metal oxide such as iridium oxide formed in situ together with the semi-conducting polymer by the application of a uniform liquid mixture followed by a controlled heat treatment.

The semi-conducting polymer is preferably formed from polyacrylonitrile, polybenzimidazo-pyrrolone or an adamantane based polybenzoxazole.

30 Claims, No Drawings

ELECTRODE COATING WITH PLATINUM-GROUP METAL CATALYST AND SEMI-CONDUCTING POLYMER

BACKGROUND OF THE INVENTION

Catalytic electrodes having a valve metal base and a catalytic coating comprising at least one platinum-group metal oxide are described for example in the following patents:

U.K. Pat. No. 1,147,442
U.K. Pat. No. 1,195,871
U.K. Pat. No. 1,231,280
U.K. Pat. No. 1,235,570
U.S. Pat. No. 3,687,724

Dimensionally stable anodes of the type described in U.K. Pat. 1,195,871 are currently used for the electrolytic production of chlorine and provide a high anode life with reduced energy consumption.

However, when such anodes are used in metal electrowinning processes where oxygen is produced at the anode, they tend to undergo passivation and thus have a relatively short useful life. Passivation seems to be caused in this case by diffusion of oxygen through the coating resulting in build-up of an insulating oxide layer on the valve metal substrate and/or dissolution of ruthenium in the surrounding acid medium. In U.S. Pat. Re. 29,419, a coating is described which is especially intended as an anode for electrowinning. Finely divided ruthenium dioxide used as an electrocatalyst is applied together with an organic polymer to a substrate, followed by curing to produce a coating comprising the electrocatalyst dispersed in an inert polymer matrix. The organic polymer is intended in this case to serve as a binder, to provide mechanical support for the electrocatalyst to provide adhesion to and protection of the underlying substrate. According to the application intended, the amount of electrocatalyst used per part by weight of the polymer may generally vary within the range from 6:1 to 1:1, in order to provide the desired properties of such a coating. The conductive properties of such a composite coating will thus depend essentially on the amount of electrocatalyst dispersed in the inert polymer matrix, as well as its size and distribution throughout the matrix. The electrocatalyst must moreover be prepared in the form of extremely fine particles of less than 0.1 micron size, and then applied together with the organic polymer as uniformly as possible in order to be able to ensure the desired properties of the coating.

The state of the art relating to composite electrodes comprising conductive fillers dispersed in a polymer matrix may be further illustrated by U.S. Pat. Nos. 3,629,007, 3,751,301 and 4,118,294. The German patent application Offenlegungsschrift 2035918 further relates to an electrode for electrolytic purposes, which comprises a metallic support coated with an organic semiconductor consisting of a polymeric metal phthalocyanine. U.S. Pat. Nos. 3,792,732, 3,881,957 and 4,090,979 moreover relate to catalytic electrode materials comprising semi-conducting polymers formed on a refractory oxide and impregnated with metal catalysts.

The production of satisfactory catalytic coatings for dimensionally stable electrodes presents in fact many complex problems due to the severe technical and economic requirements of industrial electrolytic processes. These problems relate on one hand to the choice of suitable materials to provide adequate catalytic activity and conductivity, as well as being physically and electrochemically stable under the severe operating conditions of industrial electrolytic processes, such as high current density, corrosive media and products. Good electrocatalysts such as the platinum-group metal oxides are moreover very expensive so that they must generally be used in minimum amounts and combined with cheaper inert coating materials which, however, are generally catalytically inactive and electrically non-conductive (e.g. $TiO_2$ and most organic polymers). On the other hand, many potentially interesting electrode materials may be unsuitable for the manufacture of satisfactory coatings which meet all requirements of industrial electrolytic processes. Thus, for example, various organic semi-conductors of potential interest as electrode materials, are relatively difficult to manufacture and moreover are difficult to process into satisfactory coatings.

It is an object of the present invention to provide an electrocatalytic coating comprising at least one platinum-group metal catalyst forming a uniform solid mixture with an insoluble semi-conducting polymer of an electroconductive substrate. Another object of the invention is to provide a simple process for the industrial manufacture of electrocatalytic coatings comprising at least one platinum-group metal catalyst and an insoluble semi-conducting polymer forming a uniform mixture on an electroconductive substrate.

SUMMARY OF THE INVENTION

The present invention provides an electrocatalytic coating comprising a platinum-group metal catalyst, more particularly a platinum-group metal oxide, which is finely dispersed in a semi-conducting, insoluble polymer matrix formed in situ on an electrically conductive substrate, whereby to form a catalytic electrode suitable for use in electrolytic process. The invention more particularly provides a process for manufacturing an electrocatalytic coating comprising at least one platinum-group metal catalyst and a polymer material applied to an electrically conductive substrate. This process comprises applying to a substrate a uniform liquid mixture including a predetermined amount of at least one platinum-group metal compound which can be thermally converted to said platinum-group metal catalyst, said liquid mixture further including at least one polymer which can be thermally converted to a semi-conducting insoluble polymer, said liquid mixture being successively applied in layers to the substrate and each layer being dried before the next layer is applied.

The process of the invention further comprises subjecting the resulting dried layers to heat treatment so as to form the platinum-group metal catalyst from said compound, together with said semi-conducting insoluble polymer and to thereby produce a coating consisting of a uniform solid mixture wherein the platinum-group electrocatalyst is finely dispersed in the semi-conducting insoluble polymer.

Platinum-group metals may be used as catalysts in any suitable form in the coatings of the invention, especially in the form of platinum-group metal oxides, which are particularly stable and may be simply produced according to the invention.

The substrate used in the invention may advantageously consist of an electrochemical valve metal such as titanium, in order to provide the well known advantages of valve metals as electrode substrates.

The uniform liquid mixture applied to the substrate according to the invention is preferably a homogeneous solution whereby to obtain a homogeneous mixture of the coating precursor materials dissolved in the form of molecules or ions. Emulsions may nevertheless be applied instead of homogeneous solutions if necessary e.g. in case the solvents used to respectively dissolve the organic and inorganic coating precursors may be nonmiscible, among other reasons.

The solvents used in said liquid mixture will generally be any suitable conventional solvents such as e.g. dimethyl formamide (DMF) to dissolve polyacrylonitrile (PAN) or isopropyl alcohol (IPA) to dissolve $IrCl_3$ or the like. Semiconducting insoluble polymers may be formed in coatings according to the invention by starting from various soluble polymers which can be thermally activated so as to undergo a structural change by extensive cross-linking and cyclization, whereby to form aromatic or heteroaromatic rings, so as to thus be able to form a substantially continuous planar semi-conducting polymer structure.

Polyacrylonitrile (PAN) was successfully applied in solution to produce a coating according to the invention. However, some other polymers which may be suitable are: polyacrylamide or other derivatives of polyacrylic acid. Soluble aromatic polymers may also be used in the invention, such as for example: aromatic polyamides, aromatic polyesters, polysulfones, aromatic polysulphides, epoxy, phenoxy, or alkyde resins containing aromatic building blocks, polyphenylene or polyphenylene oxides. Heteroaromatic polymers may further be suitable for the invention, such as for example polyvinyl pyridine, polyvinylpyrrolidone, or polytetrahydrofurane. Prepolymers may likewise be suitable which are convertible to heteraromatic polymers, such as for example, polybenzoxazoles or polybenzimidazopyrrolones. Polymers containing adamantane may likewise be suitable (especially the above prepolymers, containing adamantane units). Polybenzimidazopyrrolidone (pyrrone) and adamantane based polybenzoxazole (PBO) were applied in solution (in N-methyl pyrrolidone) to produce coatings according to the invention.

A coating may be produced according to the invention by applying any suitable number of layers of solution which is necessary to provide the desired thickness and surface loading while ensuring satisfactory adherence of the coating. Each dried layer of solution provides a uniform coprecipitated intimate mixture of a very finely divided catalyst precursor and the organic polymer matrix precursor.

The heat treatment of this coprecipitate is then advantageously effected in air in at least two stages at different temperatures, preferably with a reduced temperature stage in the range up to about 300° C., before applying the next layer of solution and, after applying the last layer, an elevated-temperature stage at about 400° C., but at most up to 500° C. The temperature range, duration, and ambient atmosphere of heat treatment should be controlled so as to be able to ensure extensive cross-linking and cyclization of the organic polymer precursor by thermal activation, so as to convert it into a substantially continuous semi-conducting, insoluble, polymeric network structure, while substantially preventing thermal decomposition of the organic polymer structure or carbonization of the organic polymer. These conditions of heat treatment must at the same time be selected so as to also allow conversion of the coprecipitated catalyst precursor compound into a finely divided catalyst, uniformly dispersed and completely integrated in said semi-conducting polymer network structure forming a substantially continuous matrix. One heat treatment stage in air may be carried out for example in a reduced temperature range between 250° C. and 300° C., while a subsequent stage may be carried out in air in a higher range between 300° C. and 400° C., or somewhat higher, e.g. 500° C. or even up to 600° C. in some instances. Moreover, the reduced temperature heat treatment stage in air may if necessary be followed by a heat treatment stage in a nonoxidative or inert atmosphere such as nitrogen, possibly to higher temperatures up to 800° C., for a duration for example between 15 minutes and 6 hours. The duration of heat treatment in air may vary from 5 minutes to about 2 hours according to the nature of the organic polymer. It may be noted that heat treatment in air according to the invention can provide platinum-group metal oxides at relatively low temperatures up to 400° C., while at the same time providing a semi-conducting polymer matrix. On the other hand, conventional coatings comprising platinum-group metal oxides alone, or in combination with other inorganic oxides generally require higher temperatures. Semi-conducting polymeric coatings were produced by applying several layers of PAN in solution in DMF to conductive substrates, drying, and heat treating, as described above and in the examples given further on. It was experimentally established that the coatings thus produced from PAN alone became semi-conductive after undergoing a heat treatment stage at 300° C. in air.

The invention allows substantial advantages to be achieved by means of a very simple combination of steps which can be carried out reproducibly at low cost and only require relatively simple equipment for the preparation, application and drying of exactly predetermined liquid compositions, and for controlled heat treatment.

Thus, for example, the invention may provide the following advantages:

(i) A semi-conducting, insoluble, stable polymer matrix is formed directly in situ on the substrate surface, by controlled application of a predetermined polymer containing liquid composition, followed by controlled heat treatment.

(ii) The catalyst simultaneously formed in situ is uniformly distributed throughout the semi-conducting polymer matrix so as to provide a consolidated coating of uniform composition.

(iii) This uniform distribution thus allows the catalyst to be used as effectively as possible, i.e. a minimum amount of platinum-group metal catalyst needs to be incorporated in the coating, only in order to provide adequate catalytic properties.

(iv) On the other hand, the semi-conducting polymer matrix itself provides adequate current conduction and uniform current distribution throughout the coating, thereby allowing it to support high current densities.

(v) The semi-conducting insoluble polymer matrix is moreover relatively stable and resistant to both physical and electrochemical attack, and thus may serve as a semi-conducting protective binder for the catalyst, while at the same time protecting the underlying substrate and promoting adherence of the coating to the substrate.

(vi) The above advantages may more particularly provide corrosion resistant dimensionally stable electrodes of the invention with stable electrochemical performance and a long useful life under severe operating conditions.

Electrodes coated according to the invention may be used advantageously as anodes at which oxygen is evolved, in order to more particularly provide protection of the catalyst as well as the underlying substrate. They may thus be used more particularly as anodes in electrowinning processes. The electrodes of the invention may moreover be suitable as anodes for water electrolysis. Coated electrodes of the invention may also meet the requirements of anodes for the production of chlorine or chlorate. In this case the anode coating may comprise for example a ruthenium dioxide catalyst, with additions of oxides of Sn, Pd, and/or Pb, e.g. in order to increase the oxygen over-potential. Moreover, electrodes coated according to the invention may also be usefully applied as cathodes, e.g. as cathodes at which hydrogen is generated, in chloralkali processes, water electrolysis, or other electrolytic processes.

It may be noted that platinum-group metal catalysts may be used in the metallic state in the coatings of the invention, by precipitation of any suitable soluble platinum-group metal compound when drying the applied liquid mixture, and subsequent thermal conversion of said compound to the platinum-group metal in the metallic state.

It may be noted that other materials may be uniformly incorporated in the coating according to the invention in generally the same manner as the platinum-group metal catalysts. Such materials may serve to provide given properties, e.g. to further improve conductivity and/or catalytic activity of the coating, to inhibit undesirable side-reactions (e.g. to raise the oxygen over-potential on anodes for chlorine production), to improve physical or chemical stability of the coating. The liquid mixture applied to the substrate according to the invention may moreover contain various additives to enhance the formation of a satisfactory semi-conducting polymer matrix e.g. cross-linking agents.

The invention is illustrated in the following examples with reference to experimental data in the accompanying tables.

These tables indicate the following:
The reference of each coated electrode sample
The number of layers and type of each solution applied to the coating substrate
The initial loading of the main components applied in solution per unit area of the substrate surface
The conditions of the heat treatment of said components for producing a coating
The anode current density under which each electrode sample was tested as an oxygen-evolving anode in an electrolysis cell containing 350 cc of 150 g/l $H_2SO_4$ aq. and two graphite cathodes of 100×20 mm projected area respectively disposed at a distance of 25 mm from each face of the anode
The initial anode potential of each electrode sample with respect to a normal hydrogen electrode (NHE), as well as the final potential at the end of the test period (unless the anode has failed due to a steep rise of its potential)
Finally the duration of each test period in hours, the time being marked with an asterisk if the anode is still operating or underlined if the electrode has failed.

EXAMPLE 1

Several titanium plates (100×20×1 mm) were pretreated by sand-blasting followed by an etching treatment in 10% oxalic acid at about 85° C. for 6 hours, whereby to form a microrough surface. The pretreated titanium plates were then coated to produce the electrode samples D92, C92, B08, F31, F58, D36, D72, D77 which are shown in Table 1 below.

Homogeneous solutions for producing a coating comprising iridium oxide and a semi-conducting polymer were prepared by mixing a solution of polyacrylonitrile (PAN) in dimethyl formamide (DMF) with an acid solution of $IrCl_3$aq. in isopropyl alcohol (IPA).

Three solutions prepared in this manner respectively contained the following amounts of iridium and PAN per gram of solution:

| P15a: | 7 mg Ir | 18.6 mg PAN |
| --- | --- | --- |
| P15: | 14.7 mg Ir | 16.4 mg PAN |
| P15c: | 14.7 mg Ir | 24.3 mg PAN |

Each of these solutions was successively applied with a brush in several layers to one of said tatanium plates so as to cover the entire plate surface.

The second column in Table 1 shows for each electrode sample the corresponding number of layers and the type of solution applied.

The third column in Table 1 indicates the corresponding initial loadings of Ir and PAN in grams per square meter of the titanium plate surface.

After applying each layer of solution to the titanium plate, it was subjected to drying in an oven at 100° C. for 5 minutes, and then subjected to a first heat treatment at 250° C. for 10 minutes in a stationary air atmosphere, as indicated under I in Table 1.

After applying the last layer, drying and heating as described, a second heat treatment was carried out at 300° C. for a period of 7 or 30 minutes in stationary air or in an air flow of 60 l/h as indicated under II in Table 1. This was followed by a third heat treatment at 400° C. for 7.5; 20; or 15 minutes, as indicated under III in Table 1.

The resulting coated electrode samples were then tested as an oxygen-evolving anode in an electrolysis cell containing concentrated sulphuric acid, as previously mentioned.

The anode potential of the respective electrode samples was monitored during each electrolytic test. As already mentioned, Table 1 indicates the initial anode potential (vs. NHE), for each test of a given electrode sample at the indicated current density, while the final anode potential at the end of each test is also indicated, unless the anode has failed as a result of a steep substantial rise of its potential.

The following may be noted with regard to the electrolytic test results shown in Table 1:

The electrode sample D92 with a catalytic coating having a relatively low loading of iridium oxide corresponding to 1.7 g Ir/$m^2$ and a much higher PAN loading of 4.5 g/$m^2$, operated at 500 A/$m^2$ for 1350 hours, with an initial potential of 1.60 V/NHE, and is still operating.

The electrode sample D72 with a higher loading of 3 gIR/$m^2$ and a lower loading of 3.6 g PAN/$m^2$ has a slightly higher anode potential (1.65 V/NHE) at 500 A/$m^2$ and failed after 1690 hours.

The electrode samples C92, B08, F31, F58, D36 and D77 were first tested at 500 A/m² and showed only a slight increase in potential with no notable sign of deterioration. The current density was then increased to 2500 A/m². Sample F31 is still operating at 2500 A/m² after 820 hours with no considerable increase in potential. The performance of D72 and D77 is lower than expected in view of the loading of both components and the heat treatment. One possible explanation is the low number of layers applied (corresponding to very thick layers). The premature failure of F58 may be caused by the too prolonged final heat treatment under these specific preparation conditions.

For reference, the electrode samples C94, C95 and G24 in Table 1 were prepared in substantially the same manner as in Example 1, but without including PAN in the solutions applied to the titanium plate. The solution WP15b applied to produce these samples comprised IrCl₃aq. dissolved in IPA as before, and was further diluted with DMF to provide the same iridium concentration of 14.7 mgIr/q, as in the case of the solutions P15 and P15c. Electrode samples C94 and C95 (prepared without PAN) which were coated and heat treated in three stages failed rapidly at 2500 A/m², whereas the other coatings in Table 1 had a significant lifetime at this current density. The electrode sample G24 was prepared by heat treatment under conditions suitable for obtaining a good iridium oxide coating on a titanium substrate. 10 layers were applied and after drying each layer at 100° C. for 5 minutes, the sample was heat treated at 480° C. for 7 minutes in an air flow of 60 l/h. This sample is still running at 2500 A/m² after 350 hours. However, the potential of 2.33 V is higher than the corresponding values of other electrode samples in Table 1 such as F31.

TABLE 1

| REF | SOLUTION APPLIED LAYERS SOLN. | INITIAL LOADING (g/m²) | HEAT TREATMENT I (°C.-min) atm. | II (°C.-min) atm. | III (°C.-min) atm. | TEST CONDITIONS CURRENT DENSITY (A/m²) | ANODE POT. (V/NHE) | TIME (h) |
|---|---|---|---|---|---|---|---|---|
| D 92 | 8 (P15a) | 1.7 Ir + 4.5 PAN | 250-10 stat.air | 300-7 stat.air | 400-20 air 60 l/h | 500 | 1.6–2.1 | 1350* |
| C 92 | 5 (P15) | 2.0 Ir + 2.3 PAN | 250-10 stat.air | 300-30 air 60 l/h | 400-7.5 air 90 l/h | 500 2500 | 1.67–1.68 1.70-fail | 227 767 |
| B 08 | 5 (P15) | " | 250-10 stat.air | 300-30 air 60 l/h | 400-7.5 air 90 l/h | 500 2500 | 1.58–1.69 1.73-fail | 577 737 |
| F 31 | 6 (P15) | 1.9 Ir + 2.1 PAN | 250-10 stat.air | 300-30 air 60 l/h | 400-15 air 90 l/h | 500 2500 | 1.67–1.69 1.74–1.90 | 130 820* |
| F 58 | 6 (P15) | 2.2 Ir + 2.5 PAN | 250-10 stat.air | 300-30 air 60 l/h | 400-20 air 60 l/h | 500 2500 | 1.65–1.68 1.80-fail | 120 370 |
| D 36 | 5 (P15) | 3.2 Ir + 3.6 PAN | 250-10 stat.air | 300-30 air 60 l/h | 400-7.5 air 90 l/h | 500 2500 | 1.63–1.67 1.73-fail | 350 640 |
| D 72 | 3 (P15c) | 3 Ir + 5.1 PAN | 250-10 stat.air | 300-30 air 60 l/h | 400-7.5 air 90 l/h | 500 | 1.64-fail | 1690 |
| D 77 | 3 (P15c) | 2.2 Ir + 3.6 PAN | 250-10 stat.air | 300-30 air 60 l/h | 400-7.5 air 90 l/h | 500 2500 | 1.68–1.72 1.71-fail | 150 526 |
| C 94 | 5 (WP15b) | 2 Ir | 250-10 stat.air | 300-30 air 60 l/h | 400-7.5 air 90 l/h | 500 2500 | 1.70–1.93 2.10-fail | 87 10 |
| C 95 | 5 (WP15b) | " | 250-10 stat.air | 300-30 air 60 l/h | 400-7.5 air 90 l/h | 500 2500 | 1.71– 1.83-fail | 87 10 |
| G 24 | 10 (WP15b) | " | — | — | 10 × 480-7 air 60 l/h | 500 2500 | 1.86–1.87 1.85–2.33 | 300 350* |

EXAMPLE 2

The electrode samples shown in Table 2 were prepared in the manner described in Example 1, by successively applying to a similar pretreated titanium plate layers of a solution containing both IrCl₃ and PAN, followed by drying and heat treatment.

Table 2, which is drawn up in the same manner as Table 1, shows that various modifications were made in the heat treatments to which the electrode samples were subjected in this case.

Thus, as it may be seen from Table 2:

The second heat treatment II at 300° C., previously described was omitted in the case of samples F78 and F83;

The first heat treatment I at 250° C. was omitted in the case of samples F52, C53 and C55

The last heat treatment III was omitted in the case of sample F71

The highest heat treatment temperature of sample F83 was raised to 430° C. and of sample C55 to 450° C.

This table shows again the predominant role of the heat treatment.

Electrode sample F71 which was subjected to the heat treatments I at 250° C. and II at 300° C. (for a longer period of 60 minutes), but not to a third heat treatment III at a higher temperature, failed after 5 hours at a reduced current density of only 250 A/m².

The final heat treatment at 450° C. with steps I and II also shows a deterioration.

TABLE 2

| REF | SOLUTION APPLIED LAYERS SOLN. | INITIAL LOADING (g/m²) | HEAT TREATMENT I (°C.-min) atm. | II (°C.-min) atm. | III (°C.-min) atm. | TEST CONDITIONS CURRENT DENSITY (A/m²) | ANODE POT. (V/NHE) | TIME (h) |
|---|---|---|---|---|---|---|---|---|
| F 78 | 7 (P15) | 1.8 Ir + 2 PAN | 250-10 stat.air | — | 400-15 air 60 l/h | 500 2500 | 1.64–1.71 1.75–1.92 | 150 750* |
| F 83 | 7 (P15) | " | 250-10 stat.air | — | 430-15 air 60 l/h | 500 2500 | 1.64–1.72 1.82–1.96 | 150 700* |

TABLE 2-continued

|  |  |  | HEAT TREATMENT |  |  | TEST CONDITIONS |  |  |
|---|---|---|---|---|---|---|---|---|
|  | SOLUTION APPLIED | | | | | | | |
| REF | LAYERS SOLN. | INITIAL LOADING (g/m²) | I (°C.-min) atm. | II (°C.-min) atm. | III (°C.-min) atm. | CURRENT DENSITY (A/m²) | ANODE POT. (V/NHE) | TIME (h) |
| F 52 | 4 (P15a) | 0.8 Ir + 2.1 PAN | — | 300-7 stat.air | 400-10 air 60 l/h | 500 | 1.60–2.00 | 1000* |
| C 53 | 4 (P15a) | 0.85 Ir + 2.3 PAN | — | 300-7 stat.air | 400-10 air 60 l/h | 500 | 1.85–fail | 1526 |
| C 55 | 4 (P15a) | " | — | 300-7 stat.air | 450-15 air 60 l/h | 500 | 1.7–fail | 1165 |
| F 99 | 4 (P15a) | 0.6 Ir + 1.6 PAN | 250-10 stat.air | — | 350-10 air 60 l/h | 500 | 2.3–fail | 0.03 |
| F 75 | 6 (P15) | 2.4 Ir + 2.7 PAN | — | 300-30 air 60 l/h | 415-7.5 air 60 l/h | 500 2500 | 1.64–2.05 2.04–fail | 207 13 |
| F 71 | 6 (P15) | " | 250-10 stat.air | 300-60 air 60 l/h | — | 250 | 1.64–fail | 5 |

EXAMPLE 3

The electrode samples shown in Table 3 were prepared as described in Example 1, although the last heat treatment III was effected in a nitrogen atmosphere at a flow rate of 6 l/h, at higher temperature between 500° C. and 650° C., and were heated up to these temperatures at different controlled heating rates, which are respectively indicated under III in Table 3.

Moreover, the intermediate heat treatment II was omitted in the case of the electrode samples F82 and G63. The best results were obtained for F82 with a rather fast heating rate of 300° C./h without step II.

the following amounts of solutes per gram of solution, the solvents being IPA and DMF as before:

| P58: | 5 mg Ir | 6 mg Ru | 10 mg PAN |
| P59: | 4.4 mg Ir | 10.3 mg Pt | 16.4 mg PAN |

In addition, the number of layers of P58 applied was respectively increased to 9 (for G17), 12 (F84) and 14 (for F92). As may be seen from the loadings shown in Table 5, the coatings contained here much less iridium than before, while the ruthenium content amounted to 75% of the platinum-group metal loading.

TABLE 3

|  | SOLUTION APPLIED | | HEAT TREATMENT | | | TEST CONDITIONS | | |
|---|---|---|---|---|---|---|---|---|
| REF | LAYERS SOLN. | INITIAL LOADING (g/m²) | I (°C.-min) atm. | II (°C.-min) atm. | III (°C.-min) atm. | CURRENT DENSITY (A/m²) | ANODE POT. (V/NHE) | TIME (h) |
| F 82 | 7 (P15) | 1.8 Ir + 2.0 PAN | 250-10 Stat.air | — | 500-30 N₂-6 l/h 300° C./h | 500 | 1.71–1.75 | 750* |
| F 68 | 6 (P15) | 2.2 Ir + 2.5 PAN | — | 300-30 air 60 l/h | 500-30 N₂-6 l/h 200° C./h | 500 | 1.76–fail | 12–15 |
| G 63 | 6 (P15) | 2 Ir + 2.2 PAN | 250-10 Stat.air | — | 550-30 N₂-6 l/h 350° C./h | 250 | 1.59–fail | 40 |
| D 94 | 8 (P15a) | 1.7 Ir + 4.5 PAN | 250-10 Stat.air | 300-7 Stat.air | 650-30 N₂-6 l/h 200° C./h | 500 | 1.60–fail | 0.3 |

EXAMPLE 4

The electrode samples shown in Table 4 were prepared in the manner described in Example 1, Ru or Pt being included besides Ir and PAN, and Ir being the minor component. Two solutions were prepared with A major part of the iridium may thus be replaced by ruthenium which has a much lower cost.

Table 4 shows good performance for the electrode sample F84 and F92 which are still operating. The potential of electrode samples G51 and G52 containing Pt is somewhat higher after 200 hours of operation.

TABLE 4

|  | SOLUTION APPLIED | | HEAT TREATMENT | | | TEST CONDITIONS | | |
|---|---|---|---|---|---|---|---|---|
| REF | LAYERS SOLN. | INITIAL LOADING (g/m²) | I (°C.-min) atm. | II (°C.-min) atm. | III (°C.-min) atm. | CURRENT DENSITY (A/m²) | ANODE POT. (V/NHE) | TIME (h) |
| F 84 | 12 (P58) | 0.5 Ir + 1.5 Ru + 2.50 PAN | 250-10 stat.air | 300-30 air 60 l/h | 400-10 air 60 l/h | 500 | 1.64–1.68 | 600* |
| F 92 | 14 (P58) | " | 250-10 stat.air | 300-30 air 60 l/h | 415-10 air 60 l/h | 500 | 1.71–1.67 | 150* |
| G 17 | 9 | 0.3 Ir + 0.9 Ru + 1.6 PAN | — | — | 400-2.5 air 60 l/h | 500 | 1.65–fail | 430 |
| G 51 | 7 (P59) | 1 Ir + 2.2 Pt + 3.6 PAN | 250-10 Stat.air | 300-10 air 60 l/h | 430-15 air 60 l/h | 500 | 1.77–1.80 | 200* |
| G 52 | 7 (P59) | " | 250-10 Stat.air | 300-10 air 60 l/h | 400-15 air 60 l/h | 500 | 1.77–1.87 | 200* |

EXAMPLE 5

The electrode samples shown in Table 5 were prepared in the manner described in Example 1, but the homogeneous solutions applied in this case respectively contained, in addition to IrCl$_3$aq. the following starting polymer (instead of PAN, as before). Polybenzimidazo-pyrrolone (pyrrone) or adamantane based polybenzoxazole (PBO). The solutions used in this case had the following compositions:

| | | |
|---|---|---|
| PP5 | 7.1 mg Ir/g soln. | 18.8 mg Pyrrone/g soln. |
| PP6 | 7.0 mg Ir/g soln. | 18.6 mg PBO/g soln. |

The solvent was NMP (N-methyl pyrrolidone) in this case.

As appears from the results shown in Table 5:

The electrode sample D91 with pyrrone as the starting polymer failed after 354 hours at 500 A/m$^2$.

On the other hand, the electrode sample D96 (also with pyrrone), which was heat treated in nitrogen at 650° C., failed after 15 hours.

Moreover, the electrode sample F1 which comprised PBO as the starting polymer and was heat treated in the same way as the sample D96, failed after 125 hours at 500 A/m$^2$.

The electrode sample F3 operated for 1350 hours at 500 A/m$^2$ without any change in its initial potential of 1.7 V/NHE.

The heat treatment of samples F91 and F3 at 400° C. in air flow provides better results than the heat treatments of the corresponding samples D96 and F1 at 650° C. in nitrogen.

TABLE 5

| | SOLUTION APPLIED | | HEAT TREATMENT | | | TEST CONDITIONS | | |
|---|---|---|---|---|---|---|---|---|
| REF | LAYERS SOLN. | INITIAL LOADING (g/m$^2$) | I (°C.-min) atm. | II (°C.-min) atm. | III (°C.-min) atm. | CURRENT DENSITY (A/m$^2$) | ANODE POT. (V/NHE) | TIME (h) |
| D 91 | 8 (PP5) | 1.7 Ir + 4.5 pyrrone | 250-10 stat.air | 300-120 stat.air | 400-20 air 60 l/h | 500 | 1.6-fail | 354 |
| D 96 | 8 (PP5) | " | 250-10 stat.air | 300-120 stat.air | 650-30 N$_2$-6 l/h 200° C./h | 500 | 1.6-fail | 15 |
| F 3 | 8 (PP6) | 1.7 Ir + 4.5 PBO | 250-10 stat.air | 300-120 stat.air | 400-20 air 60 l/h | 500 | 1.7-1.7 | 1350* |
| F 1 | 8 (PP6) | " | 250-10 stat.air | 300-120 stat.air | 650-30 N$_2$-6 l/h 200° C./h | 500 | 1.7-fail | 125 |

We claim:

1. A method of manufacturing an electrocatalytic coating comprising at least one platinum group metal catalyst and a polymer material applied to an electroconductive substrate characterized in that:

(a) a uniform liquid mixture containing an inorganic salt compound of a platinum group metal which can be thermally converted to said catalyst, and further comprising at least one polymer which can be thermally converted to a semi-conducting insoluble polymer, is successively applied in several layers to the substrate, each layer being dried before the next layer is applied; and (b) subjecting the resulting dried layers to heat treatment so as to form the platinum group metal catalyst together with said semi-conducting insoluble polymer and to thereby produce a coating consisting of a uniform solid mixture wherein the platinum group metal catalyst is finely dispersed in a matrix of said semi-conducting insoluble polymer.

2. A method of manufacturing an electrocatalytic coating comprising at least one platinum-group metal oxide and a polymer material applied to an electroconductive substrate characterized in that:

(a) a uniform liquid mixture containing a platinum-group metal compound which can be thermally converted to said oxide, and further comprising at least one polymer which can be thermally converted to a semi-conducting insoluble polymer, is successively applied in several layers to the substrate, each layer being dried before the next layer is applied; and (b) subjecting the resulting dried layers to heat treatment so as to form the platinum-group metal oxide together with said semi-conducting insoluble polymer and to thereby produce a coating consisting of a uniform solid mixture wherein the platinum-group metal oxide is finely dispersed in a matrix of said semi-conducting insoluble polymer.

3. The method of claim 1 or 2, characterized in that said uniform liquid mixture applied to said substrate is a solution containing predetermined amounts of said platinum-group metal compound and of said polymer.

4. The method of claim 1 or 2, characterized in that said liquid mixture is an emulsion.

5. The method of claim 2, characterized in that said substrate consists of an electrochemical valve metal.

6. The method of claim 5, characterized in that said valve metal is titanium.

7. The method of claim 2, characterized in that said polymer is polyacrylonitrile.

8. The method of claim 2, characterized in that said polymer is polybenzimidazo-pyrrolone.

9. The method according to claim 2, characterized in that said polymer is an adamantane-based polybenzoxazole.

10. The method of claims 2 or 5, characterized in that said heat treatment is carried out at a temperature in the range from about 300° C. to about 800° C.

11. The method of claim 10, characterized in that said heat treatment is carried out in air at a temperature in the range from about 300° C. to about 500° C.

12. The method of claim 11, characterized in that the duration of said heat treatment in said temperature range lies between 5 minutes and 120 minutes.

13. The method of claim 2, characterized in that said heat treatment is carried out in at least two stages at different temperatures.

14. The method of claim 13, characterized in that a first heat treatment is carried out in air in a temperature range from about 250° C. to about 300° C. after applying and drying each layer, and that a further heat treatment in a temperature range from about 300° C. to about 800° C. is carried out after applying the last layer.

15. The method of claim 14, characterized in that said further heat treatment is carried out in air in a temperature range from about 300° C. to about 500° C.

16. The method of claim 14, characterized in that said further heat treatment is carried out in a non-oxidative atmosphere.

17. The method of claim 16, characterized in that the duration of said further heat treatment is between 15 minutes and 6 hours.

18. The method of claim 1 characterized in that said substrate consists of an electrochemical valve metal.

19. The method of claim 18 characterized in that said valve metal is titanium.

20. The method of claim 1 characterized in that said polymer is polyacrylonitrile.

21. The method of claim 1 characterized in that said polymer is polybenzimidazo-pyrrolone.

22. The method according to claim 5 characterized in that said polymer is an adamantane-based polybenzoxazole.

23. The method of claim 1, 5 or 18, characterized in that said heat treatment is carried out at a temperature in the range from about 300° C. to about 800° C.

24. The method of claim 23 characterized in that said heat treatment is carried out in air at a temperature in the range from about 300° C. to about 500° C.

25. The method of claim 24, characterized in that the duration of said heat treatment in said temperature range lies between 5 minutes and 120 minutes.

26. The method of claim 1 characterized in that said heat treatment is carried out in at least two stages at different temperatures.

27. The method of claim 26 characterized in that a first heat treatment is carried out in air in a temperature range from about 250° C. to about 300° C. after applying and drying each layer, and that a further heat treatment in a temperature range from about 300° C. to about 800° C. is carried out after applying the last layer.

28. The method of claim 27 characterized in that said further heat treatment is carried out in air in a temperature range from about 300° C. to about 500° C.

29. The method of claim 27 characterized in that said further heat treatment is carried out in a non oxidative atmosphere.

30. The method of claim 29 characterized in that the duration of said further heat treatment is between 15 minutes and 6 hours.

* * * * *

UNITED STATES PATENT AND TRADEMARK OFFICE
CERTIFICATE OF CORRECTION

PATENT NO. : 4,402,996
DATED : September 6, 1983
INVENTOR(S) : Jurgen F. Gauger; Jean M. Hinden; Michael Katz It is certified that error appears in the above-identified patent and that said Letters Patent are hereby corrected as shown below:

Title Page, Item [30], the date "October 10, 1979" should appear as --October 12, 1979--.

Signed and Sealed this

Fifteenth Day of May 1984

[SEAL]

Attest:

GERALD J. MOSSINGHOFF

Attesting Officer

Commissioner of Patents and Trademarks